(12) United States Patent
Valibeygi et al.

(10) Patent No.: US 12,444,943 B1
(45) Date of Patent: Oct. 14, 2025

(54) CO-OPTIMIZATION OF DISPATCH OF MULTIPLE TYPES OF RENEWABLE ENERGY ASSETS TO SIMULATE A RENEWABLE ENERGY SYSTEM

(71) Applicant: BrightNight Power LLC, West Palm Beach, FL (US)

(72) Inventors: Amir Valibeygi, West Palm Beach, FL (US); Mohit Aggarwal, West Palm Beach, FL (US); Venkataramaavadhanulu Prava, West Palm Beach, FL (US); Danielle Nicole Labruzzo, West Palm Beach, FL (US)

(73) Assignee: BRIGHTNIGHT POWER LLC, West Palm Beach, FL (US)

( * ) Notice: Subject to any disclaimer, the term of this patent is extended or adjusted under 35 U.S.C. 154(b) by 0 days.

(21) Appl. No.: 18/986,219

(22) Filed: Dec. 18, 2024

(30) Foreign Application Priority Data

Oct. 25, 2024 (IN) .............................. 202441081350

(51) Int. Cl.
*H02J 3/00* (2006.01)
*G06F 30/20* (2020.01)
*H02J 3/38* (2006.01)
*H02J 13/00* (2006.01)

(52) U.S. Cl.
CPC .............. *H02J 3/004* (2020.01); *G06F 30/20* (2020.01); *H02J 3/38* (2013.01); *H02J 13/00001* (2020.01); *H02J 2203/20* (2020.01); *H02J 2300/24* (2020.01)

(58) Field of Classification Search
CPC ........ H02J 3/004; H02J 3/38; H02J 13/00001; H02J 2203/20; H02J 2300/24; G06F 30/20
See application file for complete search history.

(56) References Cited

U.S. PATENT DOCUMENTS

| | | | |
|---|---|---|---|
| 2011/0160926 A1* | 6/2011 | Christidis | F01K 13/02 700/287 |
| 2011/0295610 A1* | 12/2011 | Wei | G06Q 50/06 703/2 |
| 2016/0064934 A1* | 3/2016 | Zhao | H02J 3/38 700/287 |
| 2020/0044598 A1* | 2/2020 | Lima | H02J 7/35 |
| 2024/0143854 A1* | 5/2024 | Mehta | G06F 30/13 |

* cited by examiner

*Primary Examiner* — Charles Cai
(74) *Attorney, Agent, or Firm* — FOLEY & LARDNER LLP

(57) ABSTRACT

A method may include receiving first parameters of a first renewable energy asset of a first type to be simulated, wherein the first parameters include a first set of parameters within a first predetermined range, receiving second parameters of a second renewable energy asset of a second type to be simulated, wherein the second parameters include a second set of parameters within a second predetermined range, correlating the sets of parameters into a plurality of simulated REPPs, for each simulated REPP of the plurality of simulated REPPs, calculating output parameters by co-optimizing dispatch of the first renewable energy asset and the second renewable energy asset, and displaying a graph including a visual representation of one or more output parameters of the output parameters of each simulated REPP of the plurality of simulated REPPs.

18 Claims, 14 Drawing Sheets

FIG. 2

CO-OPTIMIZATION OF DISPATCH OF MULTIPLE TYPES OF RENEWABLE ENERGY ASSETS TO SIMULATE A RENEWABLE ENERGY SYSTEM

CROSS-REFERENCE TO RELATED APPLICATIONS

This application claims priority to Indian Provisional Patent Application No. 202441081350, filed Oct. 25, 2024, the disclosure of which is hereby incorporated by reference in its entirety and for all purposes.

BACKGROUND

Renewable energy systems, such as renewable energy power plants, may be simulated or modeled to predict an output of the renewable energy systems.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

FIG. 2 is an example user interface for defining multiple types of renewable energy assets.

DETAILED DESCRIPTION

Figure 1:
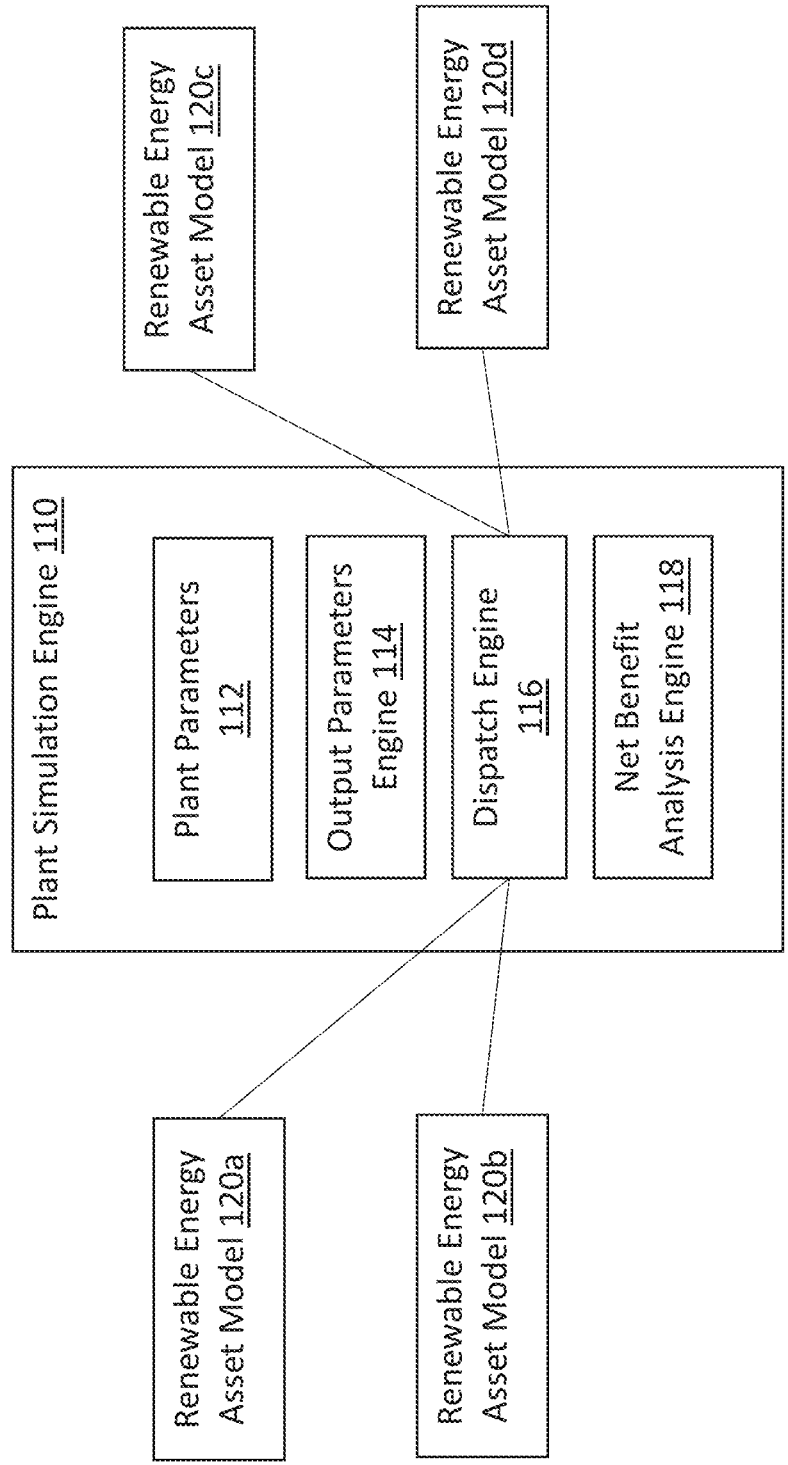
FIG. 1 is a block diagram of an example computing system for simulating output of a renewable energy power plant by co-optimizing dispatch of multiple types of renewable energy assets.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Predictions of renewable energy system (e.g., renewable energy power plant) output can be used to design renewable energy systems to meet target outputs and/or to balance various different costs and considerations. Predictions of outputs of renewable energy systems (e.g., renewable energy power plants) having multiple different asset types can be inaccurate, (e.g., sub-optimal) or can represent inefficient dispatch of the multiple different asset types. Separate predictions of average yearly output for multiple different asset types (e.g., from separately modeled asset types) exclude the synergies and real-world power delivery considerations that will impact performance of the renewable energy system once built. Embodiments and examples discussed herein provide for co-optimization of dispatch of multiple different types of renewable assets to provide accurate and optimal predictions of output for renewable energy systems. In this way, a renewable energy system including multiple renewable energy asset types and power management asset types can be designed and optimized to meet target output parameters based on output predictions that reflect efficient, simultaneous control of the multiple renewable energy asset types.

FIG. 1 is a block diagram of an example computing system 100 for simulating output of a renewable energy power plant by co-optimizing dispatch of multiple types of renewable energy assets. For case of discussion, implementations and examples discussed herein refer to renewable energy assets. However, similar description applies to non-renewable energy assets such as combustion generators, hydrogen electrolyzers, and other energy assets. In some implementations, the term renewable energy assets encompasses all assets included in a renewable energy power plant, which can be any power plant that includes renewable energy sources such as PV arrays and wind turbines. The system 100 includes a plant simulation engine 110, a first renewable asset model 120a, a second renewable asset model 120b, a third renewable asset model 120c, and a fourth renewable asset model 120d, referred to herein collectively as the renewable asset models 120.

The plant simulation engine 110 may simulate a renewable energy power plant (i.e., renewable energy system) to predict behavior and/or an output of the renewable energy power plant. The predicted output can include a total power output, a proportion of time that the output met a predefined power delivery shape, a total cost of operation, a total revenue from power generated, a profit of the renewable energy power plant, or other outputs or outcomes of the renewable energy power plant. As discussed herein, the pant simulation engine 110 may simulate dispatch of the assets of the renewable energy power plant, where the dispatch can be optimized based on various goals or optimization parameters. In this way, the predicted output can reflect the optimized dispatch of the assets of the renewable energy power plant, as simulated by the plant simulation engine 110. The optimization of the dispatch of the renewable energy power plant by the plant simulation engine 110 can be characterized as a first optimization, while a design of the renewable energy power plant using the predicted output can be characterized as a second optimization. In the first optimization, the plant simulation engine 110 optimizes over optimization parameter for dispatch. In the second optimization, a user optimizes over the same or different optimization parameters to determine a design for the renewable energy power plant.

The renewable energy power plant may include multiple types of renewable energy assets. The renewable energy power plant may include one or more renewable energy generation devices such as PV arrays, wind turbines, and hydroelectric turbines. The renewable energy power plant may include one or more energy storage devices such as lithium-ion batteries, flow batteries, iron-air batteries, compressed air energy storage devices, and other energy storage devices. The renewable energy power plant may include inverters, sensors, one or more substations, one or more transformers, and a point of interconnect (POI) to connect to a utility grid. The renewable energy power plant may include one or more controllers to modify dispatch signals of the components of the renewable energy power plant such as inverter setpoints, energy storage device charge/discharge, PV array tilt, and other parameters. A PV array may be a first type of renewable energy asset and a wind turbine may be a second type of renewable energy asset. A hydroelectric turbine may be a third type of renewable energy asset and a lithium-ion battery may be a fourth type of renewable energy asset. A type of renewable energy asset may include renewable energy assets that can be modeled in the same way. Thus, two iron-air batteries of different sizes have different parameters but are of the same type of renewable energy asset (iron-air batteries) and can be modeled using the same model. Similarly, a first PV array model may have different parameters than a second PV array model, but both the first and second PV array model are of the same type of renewable energy asset (PV arrays) and can be modeled using the same model.

The plant simulation engine 110 may include plant parameters 112 of the renewable energy power plant. The plant parameters 112 may include parameters of the renewable energy power plant such as a number of PV arrays, a model or type of the PV arrays, a location of the PV arrays, a number of wind turbines, a model or type of the wind turbines, a location of the wind turbines, a number of energy storage devices, a model or type of the energy storage devices, a location of the energy storage devices, a number of inverters, a model or type of the inverters, and connections between the various plant components. The plant parameters may include multiple different sets of plant parameters. Each set of plant parameters may represent a different simulated version of the renewable energy power plant. In an example, a first set of plant parameters includes one hundred PV arrays and ten lithium-ion batteries, and a second set of plant parameters includes one hundred and fifty PV arrays and five lithium-ion batteries. In some implementations, the sets of plant parameters can include iterations over parameters of different asset types. A user can specify a starting value, and ending value, and a step size for one or more parameters of the plant parameters 112 to generate sets of plant parameters having parameters within the specified values. In this way, the plant parameters 112 can include sets of parameters that cover different ranges of parameters, allowing for granular comparison of output of the renewable energy power plant with different variations in parameters. The plant parameters 112 can be correlated into sets of parameters representing different versions of the renewable energy power plant. The different versions of the renewable energy power plant can be simulated in batch simulations to allow for comparison of output parameters of the different versions of the renewable energy power plant.

The output parameters engine 114 may use the plant parameters 112 and the dispatch engine 116 to simulate the renewable energy power plant and its output in response to various environmental factors such as solar irradiance, cloud coverage, wind, temperature, precipitation, and other factors. In an example, the output parameters engine 114 simulates an output of a PV array of the renewable energy power plant by modeling shadows from adjacent buildings, geographic features, and clouds, simulates an output of a wind turbine based on wind data, and simulates a charge of an energy storage device based on the simulated output of the PV array and the simulated output of the wind turbine compared to a target power profile. The output parameters engine 114 may receive environmental data (e.g., weather data) and/or grid data (e.g., power prices) to generate predicted output parameters of the renewable energy power plant. The output parameters engine 114 may generate output parameters for each version of the simulated renewable energy power plant using the sets of parameters of the plant parameters 112 representing the different versions of the simulated renewable energy power plant.

The predicted output parameters can include a predicted output of the renewable energy power plant (e.g., MW, MWh, etc.). The predicted output parameters can include a predicted output for each version of the renewable energy power plant based on the corresponding parameters. In some implementations, the predicted output parameters include predicted outputs of components of the renewable energy power plant such as PV array outputs, wind turbine outputs, energy storage device charge/discharge, and inverter inputs and outputs. In an example, the predicted output parameters include a predicted output for each inverter of a plurality of inverters of the renewable energy power plant 130. In an example, the predicted output parameters include a predicted output for each PV array of a plurality of PV arrays of the renewable energy power plant. In an example, the predicted output parameters include a predicted state of charge for each energy storage device of a plurality of energy storage devices of the renewable energy power plant.

The predicted output parameters can include a shape match value representing how much the output of the renewable energy power plant fulfills a predetermined power delivery shape. The power delivery shape may include target power outputs for a period of time (e.g., a day). The shape match value may be a percentage indicating a percentage of time the output of the renewable energy power plant fulfilled the predetermined power delivery shape (i.e., power delivery profile), or what percentage of the target power outputs of the power delivery shape were met. In an example, the power delivery shape is for a day, and the shape match value indicates a percentage of target power outputs are met (predicted to be met) over the course of a year.

The plant simulation engine 110 uses environmental data for simulating the renewable energy power plant, or generating the predicted output parameters. In an example, the environmental data indicates a temperature, humidity, wind speed, cloud cover, and solar irradiance for a calendar day.

In this example, the output parameters engine 114 applies the environmental data for the calendar day to the plant parameters 112 to predict an output of the renewable energy power plant for the calendar day. In some implementations, the environmental data database 140 includes environmental data in fifteen-minute increments, such that the output prediction for the renewable energy power plant generated by the output parameters engine 114 can be generated for fifteen-minute increments, providing for granular predictions of output. The environmental data can be historical data. The different versions of the renewable energy power plant having variations of parameters can each be simulated using the same historical data, allowing for direct comparison of the predicted output parameters for the different versions of the renewable energy power plant.

The output parameters engine 114 uses the dispatch engine 116 to generate the predicted output parameters. The dispatch engine 116 simulates dispatch and/or control of the renewable energy assets of the renewable energy power plant. Dispatch may refer to resource planning at a renewable energy power plant for the assets of the renewable energy power plant, while control refers to fine-grained control (e.g., setpoint control) of the assets of the renewable energy power plant. In an example, dispatch includes setting charge/discharge setpoints of a battery, setting power output limits for a PV array, and determining power import or power export to a utility grid. In an example, control includes distributing individual set points to individual PV and battery inverters. In some implementations, dispatch has a lower frequency of commands than control. In an example, dispatch includes updating inverter setpoints every few minutes, while control includes updating inverter outputs every few seconds to meet the setpoints. The dispatch engine 116 may optimize the dispatch and interaction of the renewable energy assets to simulate dispatch of the renewable energy power plant that is optimized to match a predetermined power delivery shape, maximize use of zero-marginal-cost assets such as PV arrays, reduce operating costs, and extend asset lifespan. In an example, the renewable energy power plant will be operated to provide power that matches the power delivery shape, and so predictions of the output of the renewable energy power plant with different parameters are most useful for comparison when the renewable energy power plant is simulated based on dispatch that targets matching the power delivery shape.

The dispatch engine 116 can execute one or more of the renewable energy asset models 120 to determine the dispatch of the renewable energy assets of the renewable energy power plant. The first renewable energy asset model 120a may be a model for a first renewable energy asset type, the second renewable energy asset model 120b may be a model for a second renewable energy asset type, the third renewable energy asset model 120c may be a model for a third renewable energy asset type, and the fourth renewable energy asset model 120d may be a model for a fourth renewable energy asset type. In an example, the first renewable energy asset model 120a is a PV model for simulating output of PV arrays, the second renewable energy asset model 120b is a lithium-ion battery model for simulating lithium-ion batteries, the third renewable energy asset model 120c is a wind turbine model for simulating the output of wind turbines, and the fourth renewable energy asset model 120d is an inverter model for simulating the output of inverters. The renewable energy asset models 120 may include any number of models, and may include models for simulating any kind of renewable energy asset such as hydrogen electrolyzers and liquefiers, PV arrays, wind turbines, lithium-ion batteries, flow batteries, metal-air batteries, combustion turbines, combined cycle generators, and other assets. The dispatch engine 116 can select the one or more of the renewable energy asset models 120 based on the renewable asset types represented in the plant parameters 112 for each version of the renewable energy power plant.

The dispatch engine 116 may execute the one or more of the renewable energy asset models 120 concurrently. The dispatch engine 116 may link the one or more of the renewable energy asset models 120 such that the one or more of the renewable energy asset models 120 share information during execution. In some implementations, the one or more of the renewable energy asset models 120 are executed using as input the same environmental data (i.e., solar irradiance, temperature, wind, etc.) and also use as input data provided by the other models of the one or more of the renewable energy asset models 120. Each model of the one or more of the renewable energy asset models 120 may model control of the respective renewable energy asset type and corresponding output. The output of a first model may be provided as input to a second model. Outputs of the one or more of the renewable energy asset models 120 may be provided as inputs to other of the one or more of the renewable energy asset models 120 in an iterative manner to determine dispatch parameters and output parameters for renewable energy power plant. In an example, a lithium-ion battery model may generate a charge/discharge signal for the lithium-ion battery based on input data and model a resulting output of the lithium-ion battery. In this example, the input data may include an output of a PV array model which generates a PV array output based on solar irradiance data and an output of a wind turbine model which generates a wind turbine output based on wind data.

In some implementations, the environmental data includes weather forecast data, allowing the one or more of the renewable energy asset models 120 to generate predictions of output. In some implementations, the one or more of the renewable energy asset models 120 adjust their dispatch signals based on the weather forecast data. In some implementations, the dispatch engine 116 adjusts the dispatch signals based on the weather forecast data. Adjusting the dispatch signals based on the weather forecast data allows for the dispatch signals to be optimized based on predicted output. In an example, in response to a prediction of cloud cover that would result in a drop in PV output, the dispatch signals can be adjusted to direct power to energy storage devices to allow for the energy storage devices to provide power during the drop in PV output such that the overall output of the renewable energy power plant matches the power shape or demand shape.

In some implementations, the dispatch engine 116 provides the simulated dispatch signals to the output parameters engine 114 to generate the predicted output parameters. In this way, the predicted output parameters generated by the output parameters engine 114 can represent an output of the renewable energy power plant 130 as controlled in response to the environmental data. The dispatch engine 116 may generate the simulated dispatch signals based on the predicted output parameters. In this way, the output parameters engine 114 and the dispatch engine 116 can generate the predicted output parameters and the simulated dispatch signals in parallel. In an example, the output parameters engine 114 and the dispatch engine 116 can generate the predicted output parameters and the simulated dispatch signals in an iterative process, where intermediate predicted output parameters and intermediate simulated dispatch signals are passed back and forth between the output parameters engine 114 and the dispatch engine 116. In some implementations, the output parameters engine 114 includes the renewable energy asset models 120.

The dispatch engine 116 may co-optimize the dispatch and resulting output of the renewable energy assets corresponding to the one or more of the renewable energy asset models 120 for each version of the renewable energy power plant for a predetermined time period (e.g., one day, two days, tend days, one year, ten years, etc.). The dispatch engine 116 optimizes the dispatch and resulting output of the versions of the renewable energy power plant based on the plant parameters 112 such that the dispatch and resulting output for each version of the renewable energy plan is different. In this way, the dispatch engine 116 optimizes the dispatch and output of each version of the renewable energy power plant based on the specific parameters of each version. In this way, the optimized outputs of the different versions of the renewable energy plan can be compared to determine which version best meets the goals for the renewable energy power plant. Thus, the plant simulation engine 110 can provide for two optimizations, as discussed herein: the first optimization for the dispatch and resulting output of each version of the renewable energy power plant, and the second optimization for the parameters of the renewable energy power plant, as represented by the different versions of the renewable energy power plant.

Figure 4:
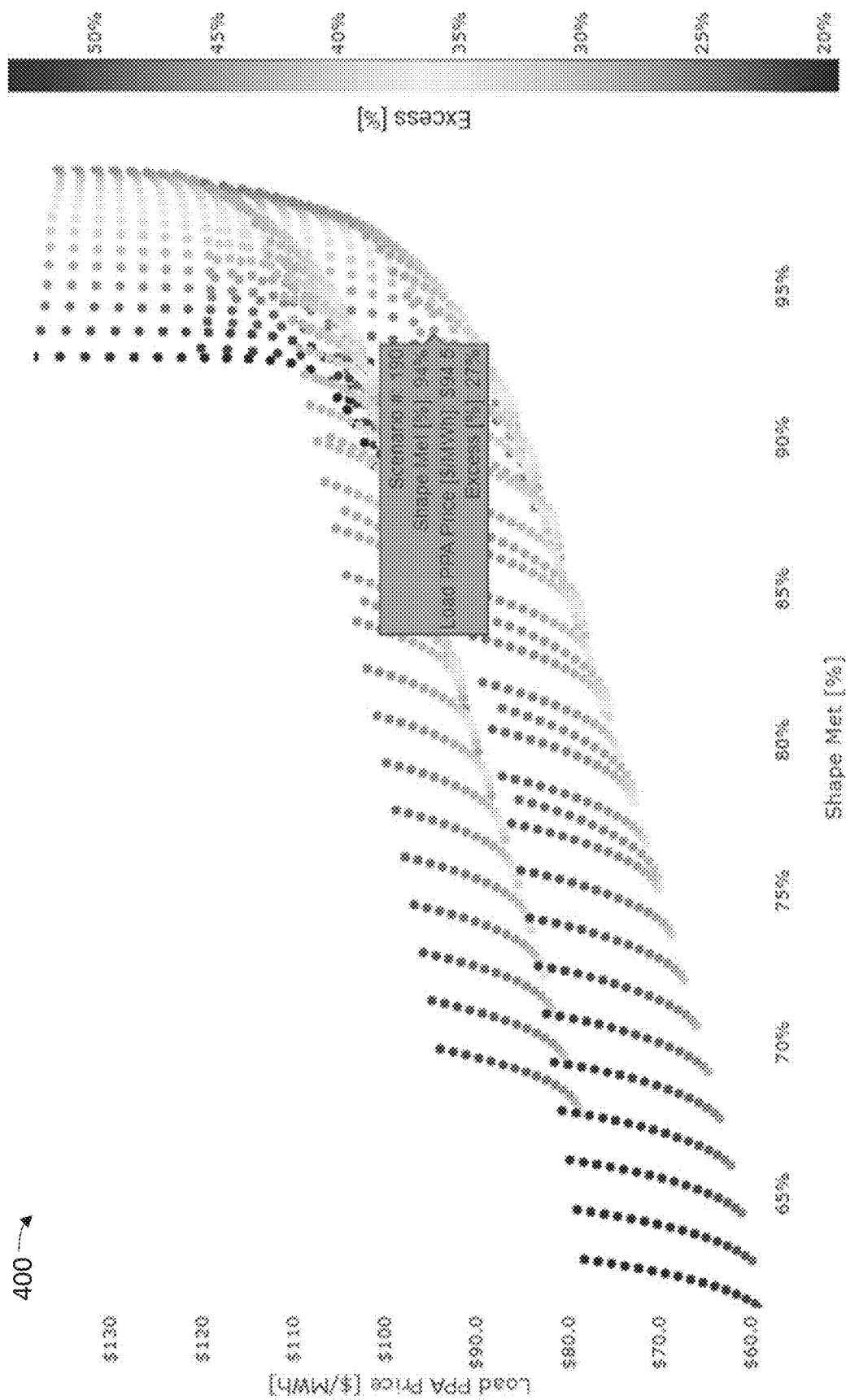
FIG. 4 is an example chart showing output parameters of versions of a simulated renewable energy power plant.

In some implementations, the output parameters engine 114 displays the predicted output parameters on a user interface. The predicted output parameters may be displayed on the user interface 134 to show a prediction of output of the versions of the renewable energy power plant having different combinations of parameters. An example of displaying the predicted output parameters is shown in FIG. 4. The display of the predicted output parameters of the versions of the renewable energy power plant can be used in the second optimization, where a user can see which version of the renewable energy power plant is optimal for the goals for the renewable energy power plant. The user can use the user interface to input first optimization parameters for the first optimization and/or second optimization parameters for the second optimization. The first optimization parameters can be implemented by the dispatch engine 116 to generate the dispatch signals based on the first optimization parameters. In an example, the first optimization parameters include component longevity and power shape (e.g., demand shape) matching, causing the dispatch signals to be generated to optimize for component longevity and power shape matching. In an example, the first optimization parameters include revenue maximization, where the renewable energy power plant buys and sells power at different times to optimize a revenue of the renewable energy power plant. The second optimization parameters can be implemented by the output parameters engine 114 to display output parameters of the versions of the renewable energy power plant including output parameters corresponding to the second optimization parameters. In an example, the second optimization parameters include a shape met percentage value and an excess power percentage, resulting in generation of a chart showing the shape met percentage versus excess power percentage for each version of the renewable energy power plant. In some implementations, the first optimization parameters and the second optimization parameters are the same, allowing for comparison of output of versions of the renewable energy power plant that are controlled to optimize for the optimization parameters, where the comparison shows how the different plant parameters represented by the versions of the renewable energy power plant reflect the optimization parameters.

In some implementations, the plant simulation engine 110 includes a net benefit analysis engine 118. The net benefit analysis engine 118 can receive as input the output parameters of the versions of the renewable energy power plant to generate a net benefit analysis for the versions of the renewable energy power plant. The net benefit analysis engine 118 can provide a financial analysis of the simulated versions of the renewable energy power plant to determine a net benefit for each version of the renewable energy power plant. In this way, implementation (e.g., construction) of a simulated version of the renewable energy power plant can be based on projected net benefit of the versions of the renewable energy power plant as informed by optimized dispatch of the versions of the renewable energy power plant.

Inputs for the net benefit analysis engine 118 can include the output parameters generated by the output parameters engine 114 and/or additional parameters generated using the output parameters. In an example, the inputs for the net benefit analysis engine 118 include a cost of capital percentage (e.g., a discount rate for net-present-value calculations and rate of return for PPA), a deal structure (e.g., contract structure such as PPA or build transfer agreement (BTA)), a capex and/or opex for each asset of the renewable energy power plant, a PPA price (e.g., PV, wind) and/or capacity price (e.g., ESS) for each asset of the renewable energy power plant, tax credit information, an effective load carry capability for the renewable energy power plant, a shape delivery value (e.g., value of each MWh of shape profile delivered), a shape delivery deficit penalty, a deficit market cost scalar for adjusting market deficit costs, an excess revenue value (e.g., value of each MWh delivered in excess of a delivery shape), an excess market revenue scalar for adjusting excess revenues, and/or market price adders for valuing deficit and excess energy delivery.

Outputs of the net benefit analysis engine 118 can include a net present value net benefit (e.g., NPV of annual net benefit from renewable energy power plant over the full project term), an internal rate of return (IRR) (e.g., IRR of annual net benefit over the full project term), a project PPA (e.g., PPA or capacity price of the renewable energy power plant to obtain a target return), a shape adjusted project PPA price (e.g., PPA price taking into account meeting a delivery shape without buying energy), a load PPA price (e.g., PPA price taking into account meeting a delivery shape with buying energy), an annual net benefit for each year of the project term, a plant capex after tax credits, a total revenue (e.g., NPV over project term, annual total revenue, annual market revenues, annual capacity revenues, annual tax credit revenues, annual excess energy revenues, annual energy delivered/shape met revenues), and/or a total cost (e.g., NPV of annual costs over project term, annual total cost, capex for each asset type, operation and maintenance cost for each asset type, PPA/capacity cost for each asset type, load deficit cost for each year of the project).

In some implementations, the net benefit analysis engine 118 outputs a risk analysis, where each of the outputs of the net benefit analysis engine 118 are given statistical variation to show how differences from projections might affect a net benefit of the versions of the renewable energy power plant. The risk analysis can include a Load PPA Price Risk Spread including statistical variations (e.g., standard deviations from mean) of the Load PPA Price.

The plant simulation engine 110 may include one or more processors and one or more non-transitory, computer-readable media including instructions which, when executed by the one or more processors, cause the one or more processors to perform operations performed by the plant simulation engine 110 as discussed herein.

Figure 2:
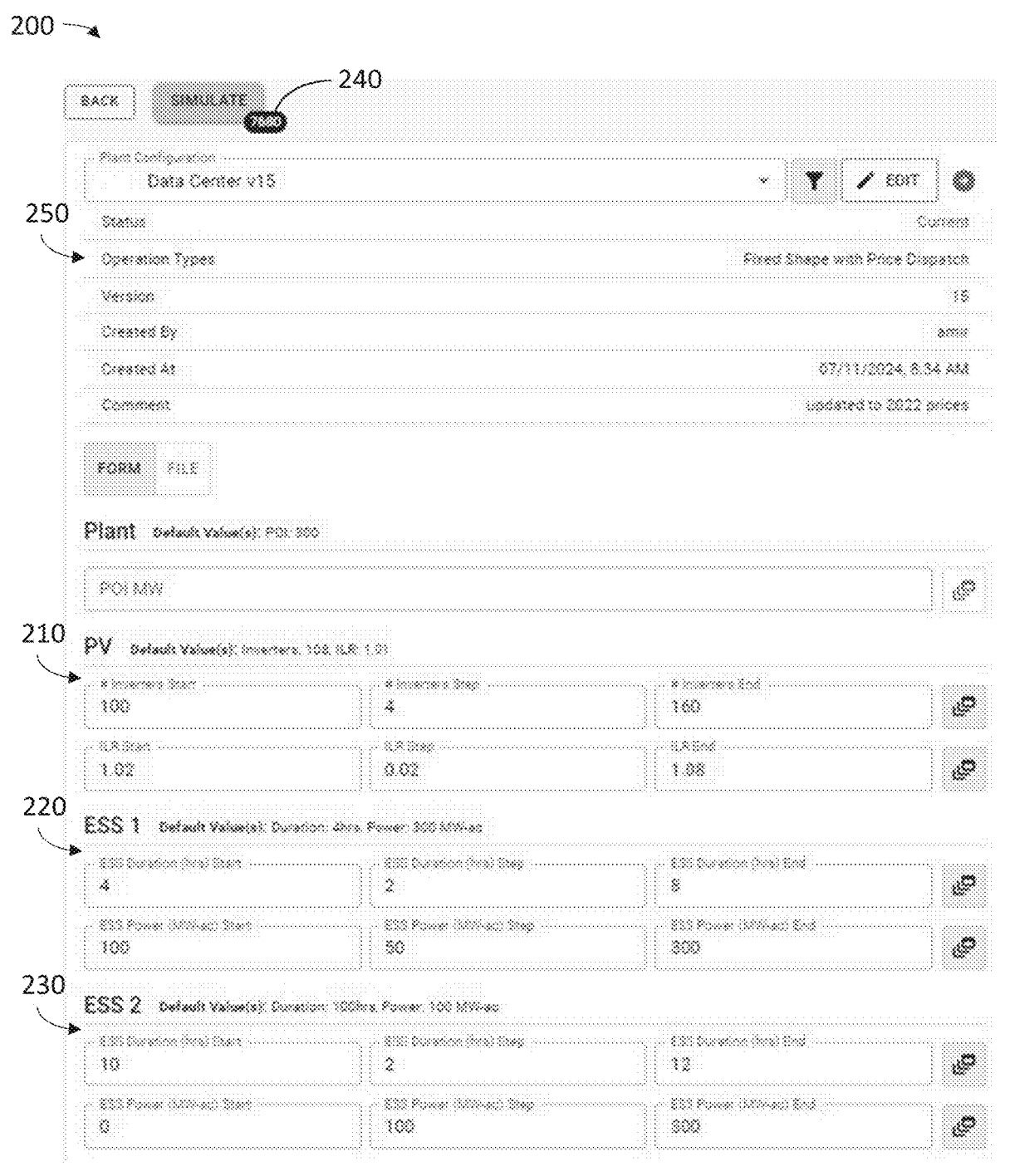

FIG. 2 is an example user interface 200 for defining multiple types of renewable energy assets. The user interface 200 may be used for defining the plant parameters 112 for the plant simulation engine 110 of FIG. 1.

The user interface 200 includes a first renewable energy asset 210 of a first type (PV). The first renewable energy asset 210 is a PV array. The first renewable energy asset 210 is defined as having parameters that vary over a spectrum. The parameters include a start value, an end value, and a step value, where the first renewable energy asset 210 has parameters ranging between the start value and the end value in steps of the step value across the different versions of the renewable energy power plant. As shown, the first renewable energy asset 210 has a start value for inverters of one hundred, an end value of inverters of one hundred and sixty, and a step value for inverters of four, meaning the versions of the renewable energy power plant will have inverters ranging from one hundred to one hundred and sixty, in increments of four. The first renewable energy asset 210 has a start value for inverter loading ratio (ILR) of 1.02, an end value for ILR of 1.08, and a step value for ILR of 0.02, meaning the versions of the renewable energy power plant will have ILR values in the range of 1.02-1.08 in increments of 0.02. The sets of parameters for the first renewable energy asset 210 may be used in generating permutations, or versions of the renewable energy power plant.

The user interface 200 includes a second renewable energy asset 220 of a second type (energy storage system). The second renewable energy asset 220 is an energy storage system, otherwise referred to as an energy storage device. The second renewable energy asset 220 is defined as having parameters that vary over a spectrum. The parameters include a start value, an end value, and a step value, where the second renewable energy asset 220 has parameters ranging between the start value and the end value in steps of the step value across the different versions of the renewable energy power plant. As shown, the second renewable energy asset 220 has a start value for ESS duration of four hours, an end value of ESS duration of eight hours, and a step value for ESS duration of two hours, meaning the versions of the renewable energy power plant will have ESS durations for the second renewable energy asset 220 in the range of 4-8 hours, in increments of two hours. The second renewable energy asset 220 has a start value for ESS power (MW-AC) of one hundred, an end value for ESS power of three hundred, and a step value for ESS power of fifty, meaning the versions of the renewable energy power plant will have ESS power values for the second renewable energy asset 220 in the range of 100-300 in increments of fifty. The sets of parameters for the second renewable energy asset 220 may be used in generating permutations, or versions of the renewable energy power plant.

The user interface 200 includes a third renewable energy asset 230 of the second type (energy storage system). The third renewable energy asset 230 is an energy storage system, otherwise referred to as an energy storage device. The third renewable energy asset 230 is defined as having parameters that vary over a spectrum. The parameters include a start value, an end value, and a step value, where the third renewable energy asset 230 has parameters ranging between the start value and the end value in steps of the step value across the different versions of the renewable energy power plant. As shown, the third renewable energy asset 230 has a start value for ESS duration of ten hours, an end value of ESS duration of twelve hours, and a step value for ESS duration of two hours, meaning the versions of the renewable energy power plant will have ESS durations for the second renewable energy asset 230 of ten and twelve hours. The third renewable energy asset 230 has a start value for ESS power (MW-AC) of zero, an end value for ESS power of three hundred, and a step value for ESS power of one hundred, meaning the versions of the renewable energy power plant will have ESS power values for the second renewable energy asset 230 of zero (not present), one hundred, two hundred, and three hundred. The sets of parameters for the third renewable energy asset 230 may be used in generating permutations, or versions of the renewable energy power plant.

The sets of parameters for the first renewable energy asset 210, the second renewable energy asset 220, and the third renewable energy asset 230 may result in different permutations of values for different versions of the renewable energy power plant. The user interface 200 may include a permutations indicator 240 indicating the number of permutations resulting from the values for the first renewable energy asset 210, the second renewable energy asset 220, and the third renewable energy asset 230 and the number of versions of the renewable energy asset representing the different permutations. In an example, the permutations indicator 240 indicates, as shown, that the values for the first renewable energy asset 210, the second renewable energy asset 220, and the third renewable energy asset 230 result in 7,680 permutations. The different permutations, or different versions of the renewable energy power plant, can be simulated in a batch simulation to allow for comparison between output parameters of the different permutations or different versions of the renewable energy power plant.

The renewable energy power plant can include any number of assets of various different types. While FIG. 2 illustrates a PV asset and an ESS asset, the renewable energy power plant can include one or more hydrogen assets (electrolyzer and/or liquefier), one or more thermal assets, and/or other assets.

The user interface 200 includes an operation type indicator 250. The operation type indicator 250 indicates how the versions of the renewable energy power plant are controlled to generate predicted output parameters, as discussed herein. The operation type indicator 250 may indicate optimization parameters for the first optimization for optimizing dispatch of the first renewable energy asset 210, the second renewable energy asset 220, and the third renewable energy asset 230. The operation type indicator 250 can represent optimization parameters for the first optimization performed by the plant simulation engine 110 of FIG. 1.

In an example, the operation type indicator 250 indicates, as shown, that the operation type is "Fixed Shape with Price Dispatch," meaning that the renewable energy power plant will be controlled to optimize to match a predetermined power shape (e.g., demand shape) and price of energy sold and/or bought. In this example, the renewable energy power plant will be controlled to minimize a net cost, as indicated by a price profile, of meeting a load shape by using an optimal combination of power plant assets and grid energy at market prices.

In an example, the operation type indicator 250 indicates that the operation type is "Fixed Shape," meaning that the renewable energy power plant will be controlled to minimize a shortfall or deficit between the renewable energy power plant's power output and the load shape. In this example, a secondary objective can be to reduce excess power output above the load shape.

In an example, the operation type indicator 250 indicates that the operation type is "Price Dispatch," meaning that the renewable energy power plant will be controlled to maximize a revenue generated by exporting and importing power from the utility grid. In this example, power can be stored when prices are low and sold to the grid when prices are high.

In an example, the operation type indicator 250 indicates that the operation type is "As Available without Clipping Capture," meaning that the renewable energy power plant directs power directly to the utility grid, subject to limits of the plant such as inverter limits and point-of-interconnect (POI) limits that result in clipping power. In this example, power is delivered to the grid as the power is generated. In an example, the operation type indicator 250 indicates that the operation type is "As Available with Clipping Capture," meaning that the renewable energy power plant directs power directly to the utility grid, subject to limits of the plant such as inverter limits and POI limits that result in excess power being stored instead of clipped. In this example, power is delivered to the grid as the power is generated up to the POI limit, with excess power being stored for delivery to the grid as soon as the POI limit allows. The two "As Available" operation types may represent operation types that do not involve optimization, as power is delivered as it is generated, or as it is available.

Price types for operation types (e.g., Price Dispatch, Fixed Shape with Price Dispatch) can be specified to determine how the renewable energy power plant takes into account prices. In an example, market prices are used including single-year historical market prices in intervals ranging from 5 minutes to one hour. In an example, multi-year forward price curves are used including multi-year historical market prices in intervals ranging from 5 minutes to an hour. In an example, daily price shapes are applied to monthly forecasts of future on-peak and off-peak prices to obtain more granular price expectations than monthly prices. The application of daily price shapes to expected monthly prices can be referred to as "price cracking." In some implementations, energy is sent from the renewable energy power plant to a first utility grid and is received at the renewable energy power plant from a second grid, where different prices (and different price types) are applied for the different utility grids.

Shape profiles for operation types (e.g., Fixed Shape, Fixed Shape with Price Dispatch) can be specified to determine what shape the renewable energy power plant uses in optimizing dispatch. The shape profile can include a shape, one or more deficit penalties for delivery of energy below the shape, and/or one or more excess revenue values for delivery of energy above the shape.

In some implementations, the user interface 200 includes an indication of simulation length. The simulation length defines a time period over which the output of the multiple different versions of the renewable energy power plant is simulated. The simulation length can be one day, two days, ten days, one year, two years, ten years, or any amount of time. The indication of simulation length can specify whether the simulation is executed using historical data such that the time period simulated reflects past and/or future dates. In an example, the indication of simulation length is ten years, where the ten years span a previous ten years such that historical weather data can be used. In an example, the indication of simulation length is ten years, where the ten years span a future ten years, allowing analysis of expected future performance. In an example, the indication of simulation length is five years, where the first two years are historical years and the last three years are future years.

The simulation parameters specified in the user interface 200 (e.g., assets, operation type, simulation length, etc.) can be used to perform a batch simulation of the parameter permutations or different versions of the renewable energy plant to compare output parameters of the different versions of the renewable energy plant. In some implementations, the simulation parameters can be specified in a file, such as a CSV file.

Figure 3:
FIG. 3 is an example user interface showing output parameters of versions of a simulated renewable energy power plant.

FIG. 3 is an example user interface 300 showing output parameters of permutations or versions of a simulated renewable energy power plant. The output parameters may be generated by performing a batch simulation of the versions of the simulated renewable energy power plant. The user interface 300 includes input parameters 310 indicating the input parameters of the versions of the renewable energy power plant. The input parameters 310 may vary over ranges such as the ranges defined in the user interface 200 of FIG. 2. The input parameters 310 may correspond do the values in the user interface 200 of FIG. 2. The input parameters 310 represent plant parameters of the versions of the renewable energy power plant. The input parameters 310 may be correlated into the different versions of the renewable energy power plant, such that each permutation of the input parameters is represented as a version of the renewable energy power plant.

The user interface includes output parameters including total annual load match 320 and shape percent match 330. The total annual load match 320 may be defined as the total annual power output of the renewable energy power plant as a percentage of a total annual load shape demand. Values of over 100% indicate excess power that is diverted to other uses or curtailed. The shape percent match 330 may represent a percentage of time over a time period that the output of the renewable energy power plant met the power shape. In an example, the shape percent match 330 renewable energy power plants an average of hourly shape met values, where each hour shape met value represents the output of the renewable energy plant as a percentage of the power shape or demand shape for that hour. The shape percent match 330 may represent a percentage of hourly target power outputs of the power shape that were met by the output of the renewable energy power plant.

The user interface 300 may include additional output parameters including total cost, total earnings, total net present value, internal rate of return, project power purchase agreement (PPA) value, shape adjustment cost, amount of load met, amount of load matched with renewable energy, amount of load met on annual basis, amount of load matched with renewable energy on annual basis, cost of energy produced, revenue for power sold, and other output parameters. The output parameters can be generated by the output parameter engine 114 of FIG. 1. The output parameters can allow for comparison of the versions of the renewable energy power plant to determine which version to implement. The user interface 300 may allow for filtering or sorting according to different output parameters. Sorting according to output parameters may be similar to specifying the second optimization parameters for determining which version of the renewable energy power plant best meets the goals for the power plant, or for performing the second optimization to determine which version optimizes the goals for the renewable energy power plant.

In some implementations, the output parameters include parameters that can be used to optimize a return or profit of the renewable energy power plant. In an example, a net benefit analysis of the output parameters can be used to determine expected revenue streams of the renewable energy power plant. The output parameters can include output parameters generated by the output parameters engine 114 and the net benefit analysis engine 118 of FIG. 1.

FIG. 4 is an example chart 400 showing output parameters of versions of a simulated renewable energy power plant. The chart 400 may display two or more output parameters of versions of the renewable energy power plant. In some implementations, the chart 400 displays, as shown, three or more output parameters of the versions of the renewable energy power plant. In an example, the chart 400 includes, as shown, dots having an X-axis position indicating a percent shape met, a Y-axis position indicating a load PPA price, and a color indicating a percent excess power. The load PPA price may include asset (e.g., PV, ESS, etc.) costs, tax credits, surplus bonuses and deficit penalties for delivered energy above and below the delivery shape, and market deficit costs normalized by total shape to indicate a cost of each MWh produced by the renewable energy power plant under a PPA. In some implementations, the chart 400 displays four output parameters of the versions of the renewable energy power plant where an X-axis position, a Y-axis position, a color, and a size each indicate an output parameter. In an example, a dot size may indicate a fourth output parameter. Additional visual indicators can be used to display output parameters such as Z-axis position, icon shape (dot, square, cross, etc.), and other visual indicators.

The chart 400 may allow for visual display of the output parameters of multiple versions of the renewable energy power plant. In some implementations, the chart 400 displays the output parameters illustrated in the user interface 300 of FIG. 3. The chart 400 may allow for the second optimization, where a version of the renewable energy power plant is selected based on the second optimization factors. The chart 400 may be generated based on the second optimization factors to display output parameters corresponding to the second optimization factors. In an example, a user indicates optimization factors of percent shape met, load PPA price, and percent excess power, causing the chart 400 to be displayed. In this example, the user can see that an optimal version of the renewable energy power plant lies on or near an elbow point on the right side of the chart 400. In some implementations, user input selecting a version of the renewable energy power plant causes additional output parameters of the selected version to be displayed on the chart 400. In some implementations, user input selecting a version of the renewable energy power plant causes the output parameters of the selected version indicated on the chart 400 to be displayed in a text box on the chart 400.

Figure 5:
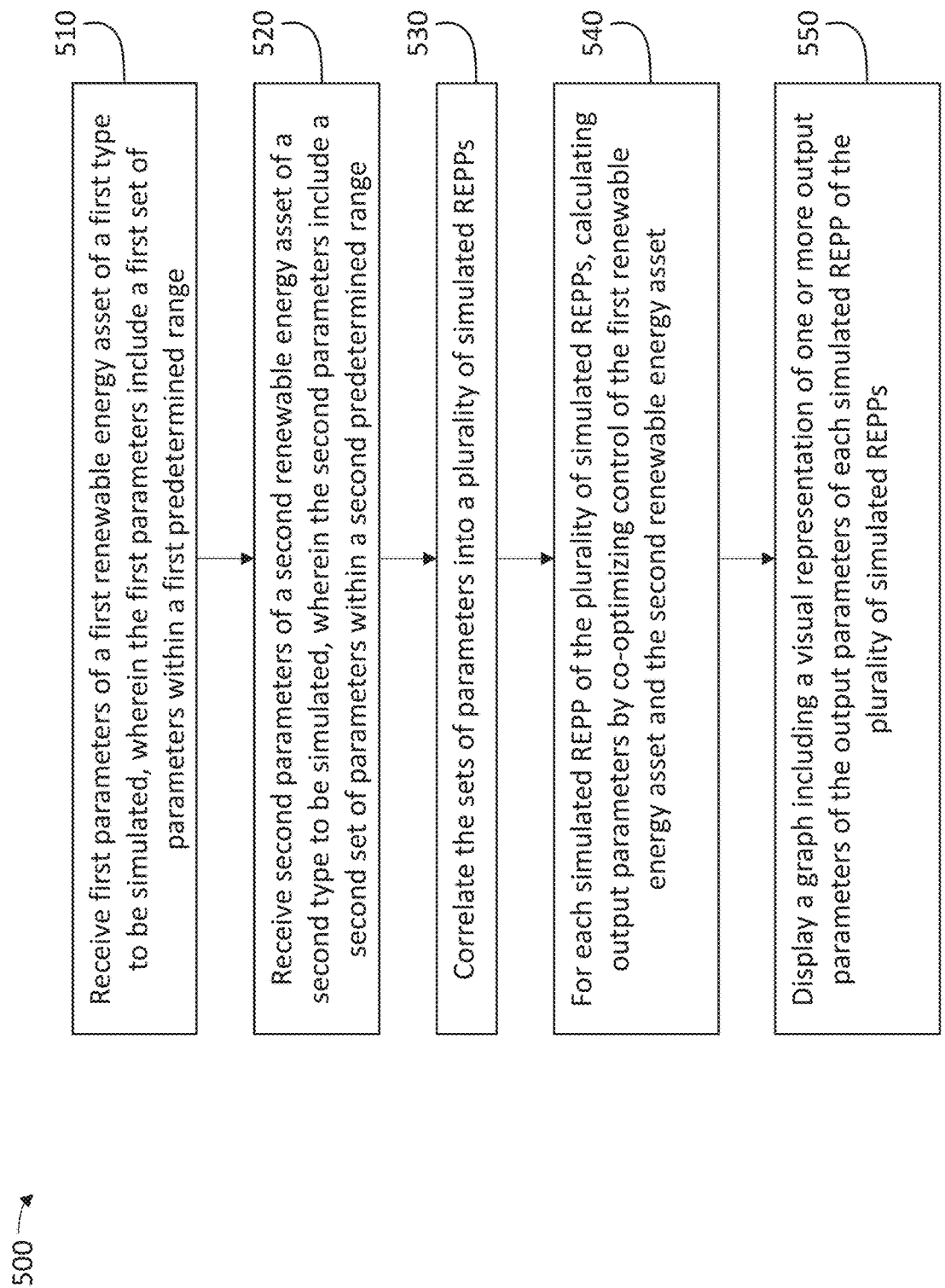
FIG. 5 is a flow chart illustrating example operations of a method for simulating output of a renewable energy power plant by co-optimizing dispatch of multiple types of renewable energy assets.

FIG. 5 is a flow chart illustrating example operations of a method 500 for simulating output of a renewable energy power plant by co-optimizing dispatch of multiple types of renewable energy assets.

At operation 510, first parameters of a first renewable energy asset of a first type to be simulated are received, where the first parameters include a first set of parameters within a first predetermined range. In some implementations, receiving the first parameters includes receiving the first predetermined range and increments within the first predetermined range. An example of receiving the first predetermined range and increments within the first predetermined range is shown in the user interface 200 of FIG. 2.

At operation 520, second parameters of a second renewable energy asset of a second type to be simulated are received, where the second parameters include a second set of parameters within a second predetermined range.

At operation 530, the first and second sets of parameters are correlated into a plurality of simulated renewable energy power plants, or versions of a simulated renewable energy power plant. In some implementations, the first type of renewable energy asset is PV arrays, and the second type of renewable energy asset is energy storage systems. Thus, the first and second parameters represent variations on PV and energy storage parameters. Correlating the first and second sets of parameters may include generating simulated renewable energy power plants or versions of the simulated renewable energy power plant such that each permutation of the parameters is represented as a simulated renewable energy power plant or a version of the simulated renewable energy power plant.

At operation 540, for each simulated renewable energy power plant, or version of the simulated renewable energy power plant, output parameters are calculated by co-optimizing dispatch and/or control of the first renewable energy asset and the second renewable energy asset. In some implementations, co-optimizing dispatch of the first renewable energy asset and the second renewable energy asset includes controlling the first renewable energy asset and the second renewable energy asset based on a predetermined power delivery profile. In an example, the first renewable energy asset and the second renewable energy asset are controlled such that their combined output, or the output of the renewable energy power plant matches a power delivery profile.

In some implementations, co-optimizing dispatch of the first renewable energy asset and the second renewable energy asset includes executing a first model for the first renewable energy asset and a second model for the second renewable energy asset, wherein the first model and the second model are linked during execution to co-optimize the dispatch of the first renewable energy asset and the second renewable energy asset. The first model and the second model may be linked by sharing data between the first model and the second model. In an example, the first model and the second model iteratively share intermediate output parameters for adjustment of dispatch signals. In an example, a dispatch engine, such as the dispatch engine 116 of FIG. 1, adjusts dispatch signals of the first model and the second model in order to execute the first model and the second model concurrently, with inputs and/or dispatch signals of the first model and the second model adjusted by the dispatch engine based on outputs and/or dispatch signals of the first model and the second model.

In some implementations, the renewable energy power plant includes a third renewable asset. The third renewable asset may be a type of renewable asset selected from the first type of renewable energy asset, the second type of renewable energy asset, and a third type of renewable energy asset. In an example, the first type of renewable energy asset is a PV array, the second type of renewable energy asset is a lithium-ion battery, and the third type is either a PV array, a lithium-ion battery, or a separate type, such as a wind turbine, hydroelectric turbine, combustion turbine, iron-air battery, flow battery, or other type of renewable energy asset. Calculating the output parameters for each simulated renewable energy power plant, or each version of the simulated renewable energy power plant may include co-optimizing dispatch of the first renewable energy asset, the second renewable energy asset, and the third renewable energy asset. The renewable energy power plant can include any number of renewable energy assets, and any number of types of renewable energy assets dispatch of which can be co-optimized to generate the output parameters of the renewable energy power plant.

At operation 550, a graph is displayed including a visual representation of one or more output parameters of the output parameters of each simulated renewable energy power plant of the plurality of simulated renewable energy power plants, or each version of the simulated renewable energy power plant. In some implementations, each visual representation includes a position on the graph indicating two output parameters and a color indicating a third output parameter. An example of the graph is the graph 400 of FIG. 4.

In some implementations, the method 500 includes receiving user input selecting a simulated renewable energy power plant of the plurality of simulated renewable energy power plants, or a version of the simulated renewable energy power plant, and displaying one or more additional output parameters of the selected simulated renewable energy power plant or version of the simulated renewable energy power plant.

Figure 6:
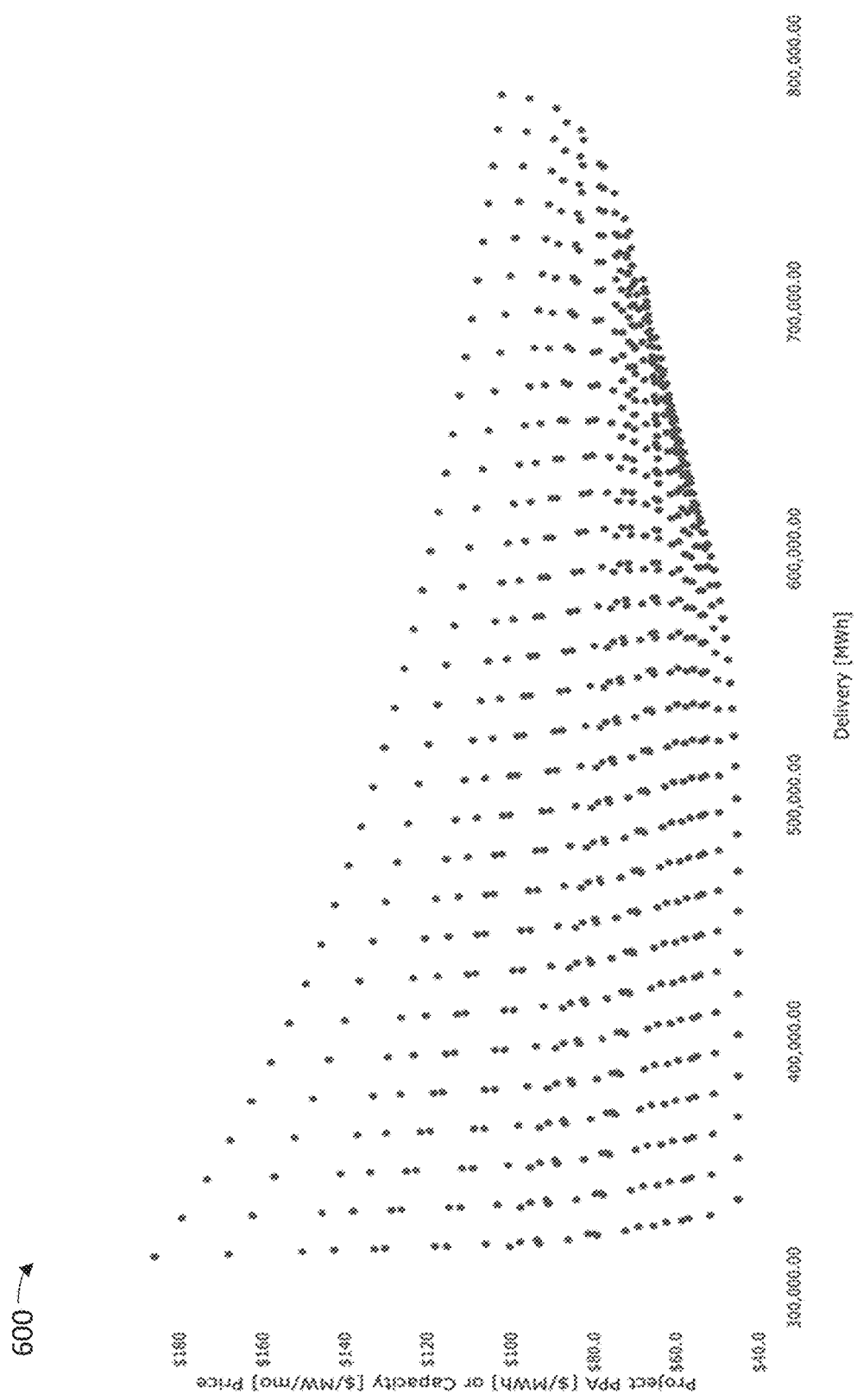
FIG. 6 illustrates an example chart showing power delivery in MWh versus Project power purchase agreement (PPA) in dollars per MWh for a batch simulation of multiple simulated plant configurations.

FIG. 6 illustrates an example chart 600 showing power delivery in MWh versus project PPA ($/MWh) or capacity price ($/MW/month) for a batch simulation of multiple simulated plant configurations. The project PPA or capacity price can indicate a price to obtain a target return on capital over the full project term, or life of the renewable energy power plant. The chart 600 can be used to identify a simulated version of the renewable energy power plant having parameters that result in an optimal balance between the project PPA or capacity price and the power delivery. The chart 600 can be used in the second optimization, where a version of the renewable energy power plant is selected to optimize for the project PPA or capacity price and the power delivery.

Figure 7:
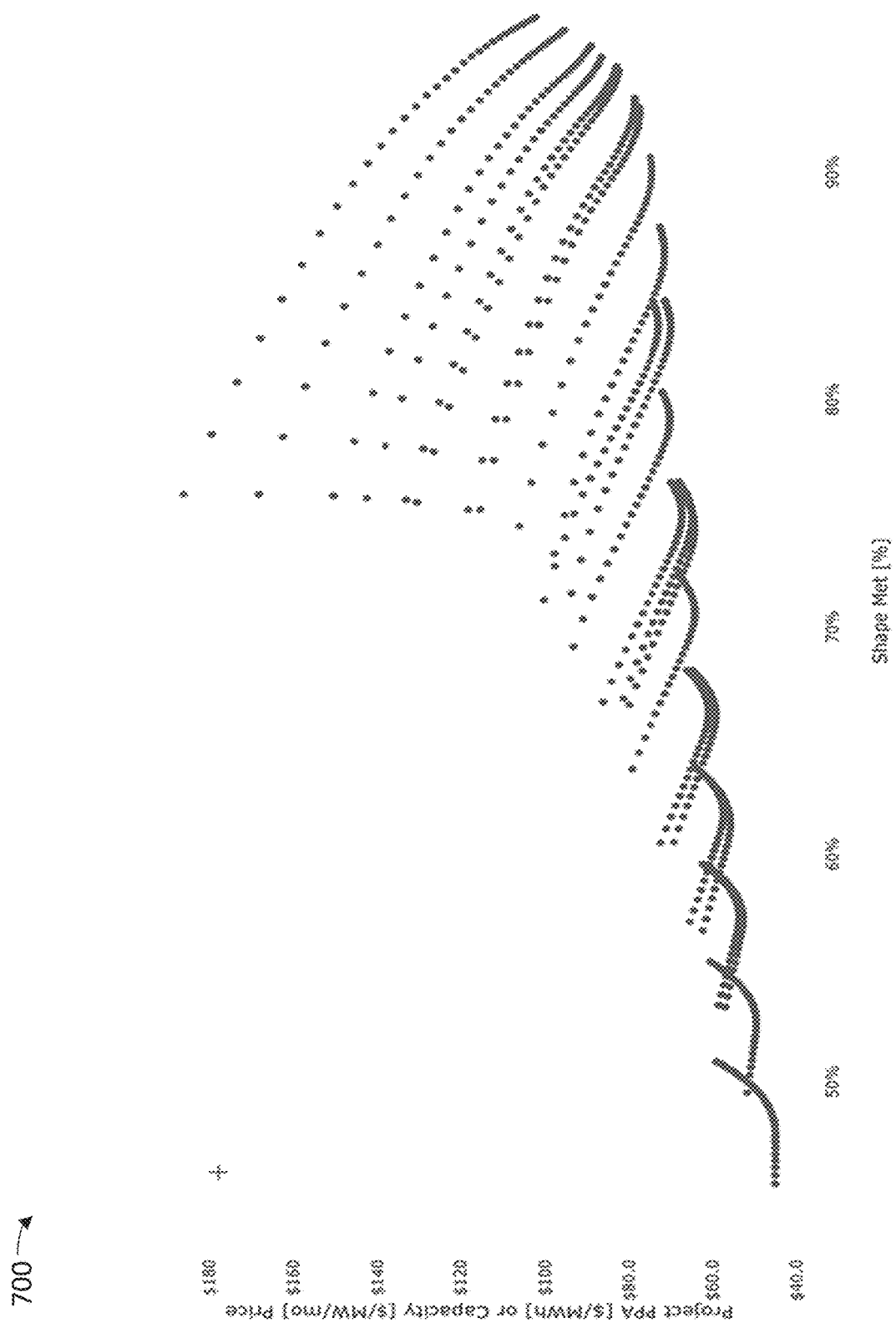
FIG. 7 illustrates an example chart showing shape met percentage versus Project PPA in dollars per MWh for a batch simulation of multiple simulated plant configurations.

FIG. 7 illustrates an example chart 700 showing shape met percentage versus project PPA ($/MWh) or capacity price ($/MW/month) for a batch simulation of multiple simulated plant configurations. The chart 700 can be used in the second optimization, where a version of the renewable energy power plant is selected to optimize for the project PPA or capacity price and the shape met percentage.

Figure 8:
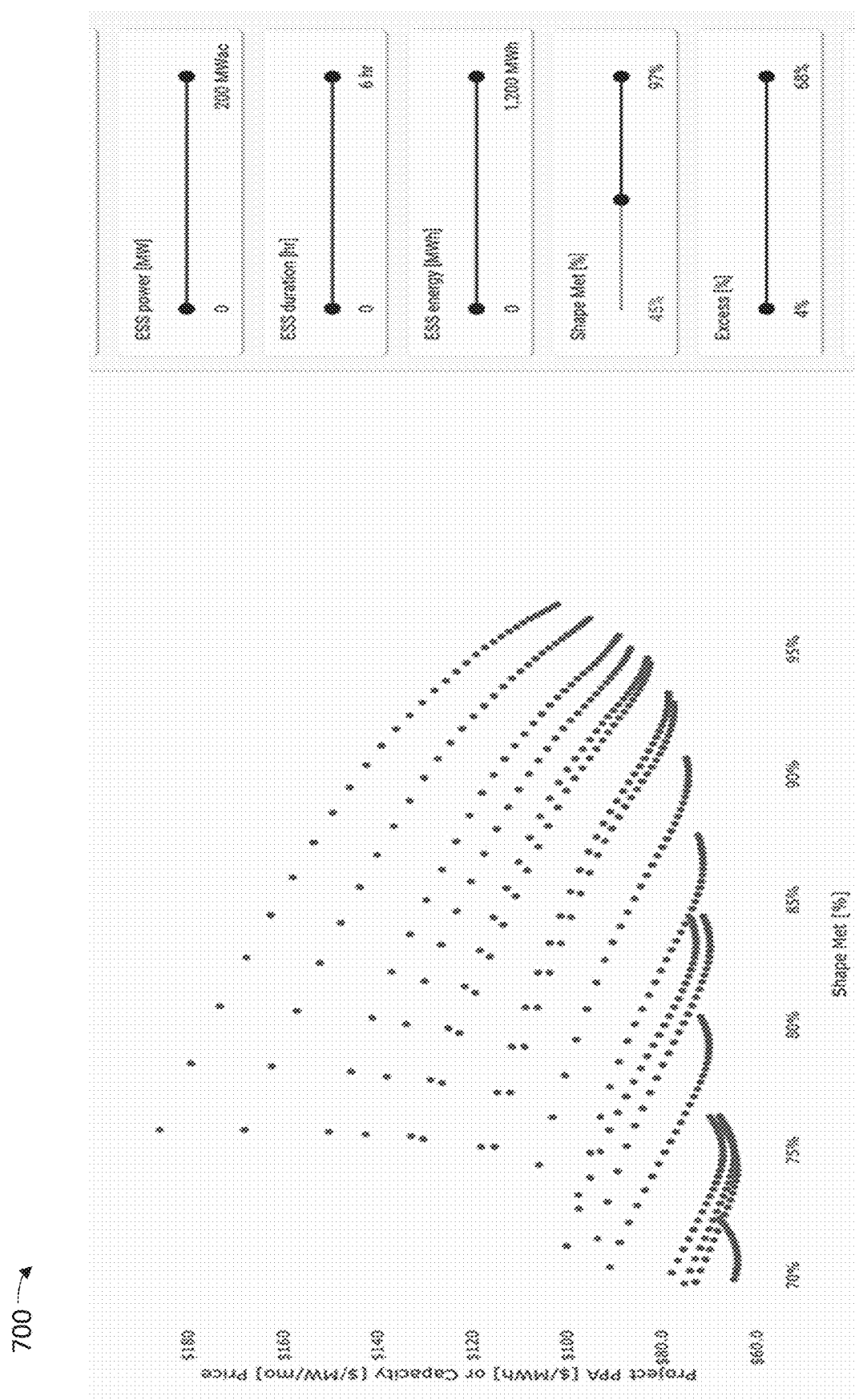
FIG. 8 illustrates the chart of FIG. 7, filtered to show simulated plant configurations having a shape met percentage above 70%.

FIG. 8 illustrates the chart 700 of FIG. 7, filtered to show simulated plant configurations having a shape met percentage above 70%. Filtering the chart 700 allows for improved selection of a version of the renewable energy power plant having parameters that optimize for the project PPA or capacity price and the shape met percentage.

Figure 9:
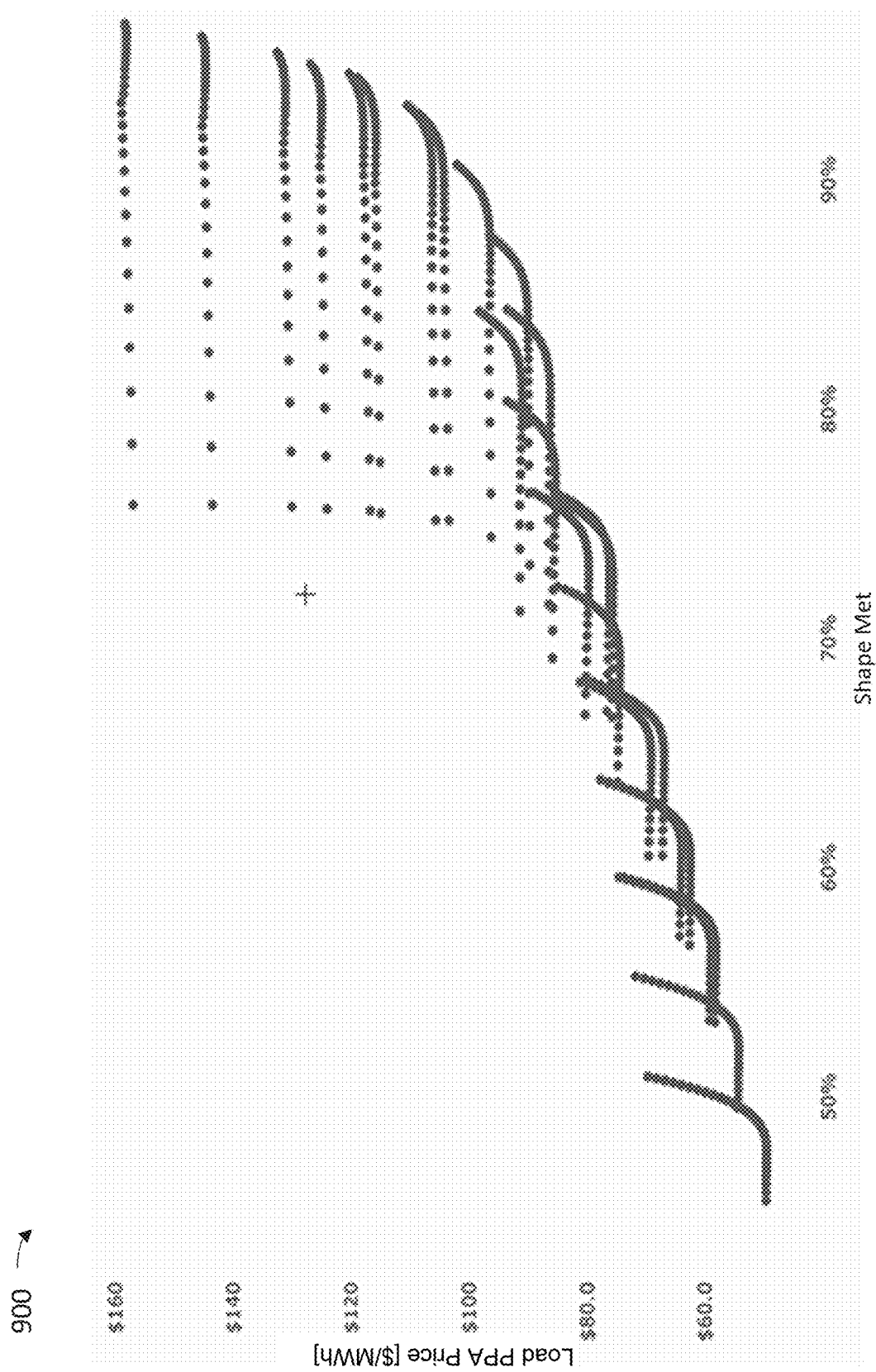
FIG. 9 illustrates an example chart showing shape met percentage versus Load PPA Price in dollars per MWh for a batch simulation of multiple simulated plant configurations.

FIG. 9 illustrates an example chart 900 showing shape met percentage versus load PPA Price ($/MWh) for a batch simulation of multiple simulated plant configurations. The chart 900 may be similar to the chart 700 of FIG. 7, but whereas the chart 700 shows shape met percentage versus project PPA price (cost of power produced by the renewable energy power plant), the chart 900 shows shape met percentage versus load PPA price (cost of power generated by the renewable energy power plant as used by the load, factoring in value of excess energy, etc.). The load PPA price takes into account the price at which the load can purchase power in order to compensate for energy delivered by the renewable energy power plant less than the shape. The chart 900 can be used in the second optimization, where a version of the renewable energy power plant is selected to optimize for the load PPA price and the shape met percentage.

Figure 10:
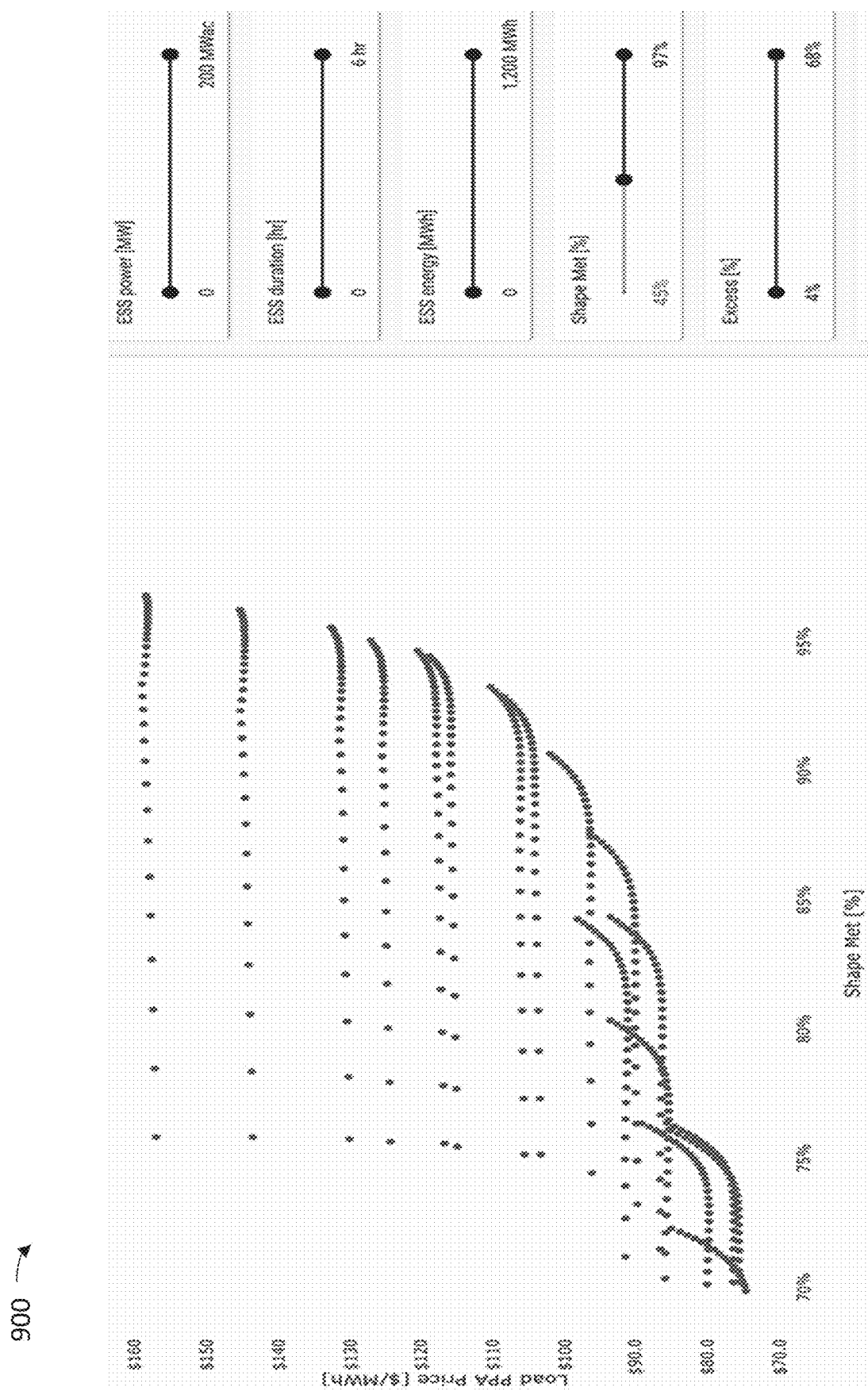
FIG. 10 illustrates the chart of FIG. 9, filtered to show simulated plant configurations having a shape met percentage above 70%.

FIG. 10 illustrates the chart of FIG. 9, filtered to show simulated plant configurations having a shape met percentage above 70%. Filtering the chart 900 allows for improved selection of a version of the renewable energy power plant having parameters that optimize for the load PPA price and the shape met percentage.

Figure 11:
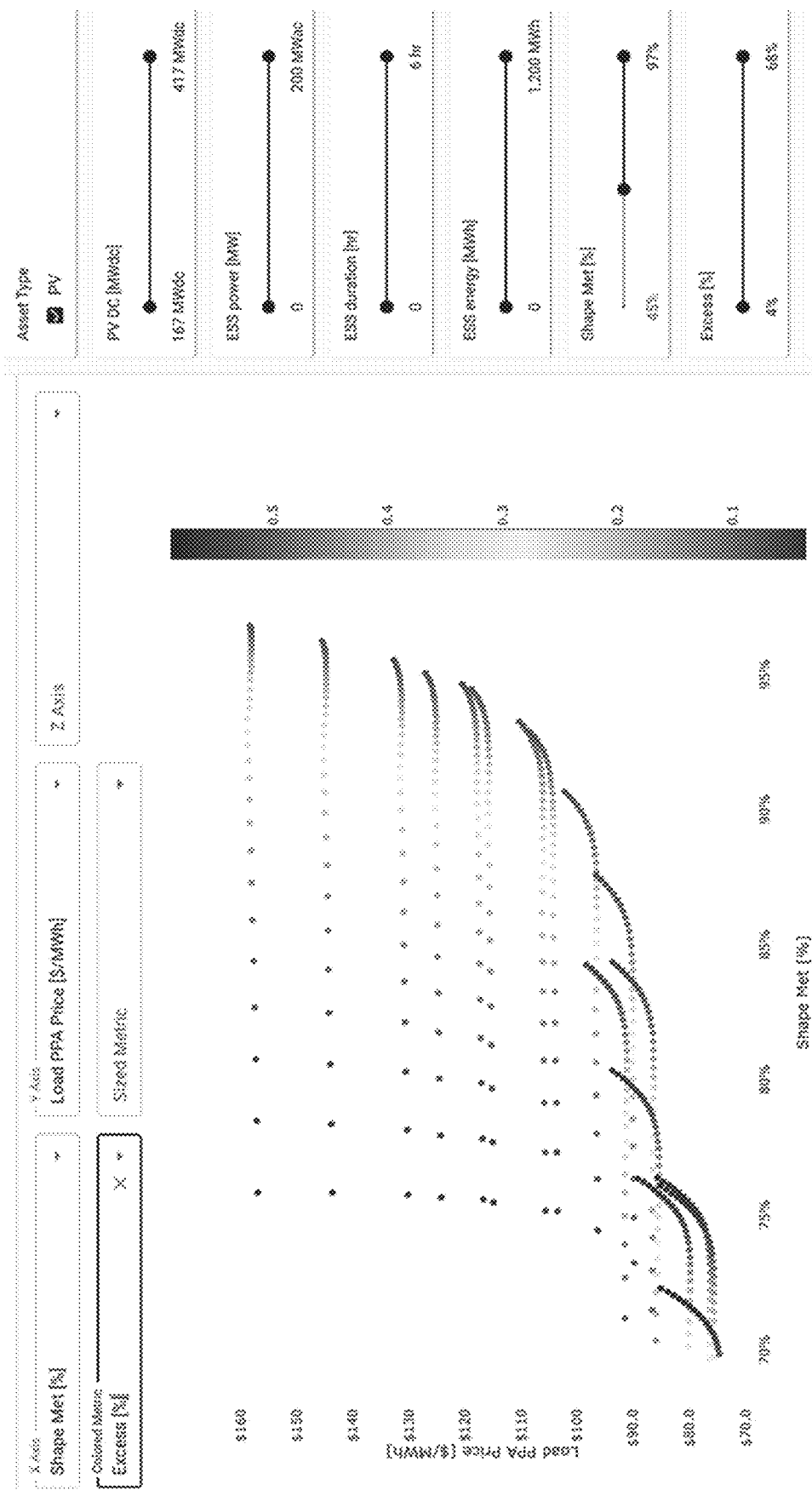
FIG. 11 illustrates the chart of FIG. 10, with points on the chart color-coded according to a percentage of power that is generated in excess of the load demand shape.

FIG. 11 illustrates the chart 900 of FIG. 10, with points on the chart 900 color-coded according to a percentage of power that is generated in excess of the load demand shape. The color-coded dots of the chart 900 add an additional parameter to the chart 900, allowing for optimization of the load PPA price, the shape met percentage, and the excess power generation. The excess power generation may be considered a risk parameter, reflecting exposure to fluctuating energy market prices, as excess power generation may be sold to the utility grid according to the fluctuating energy market prices. The chart 900 of FIG. 11 can facilitate the second optimization, where a version of the renewable energy power plant is selected to optimize for the load PPA price, the shape met percentage, and the excess power generation.

Figure 12:
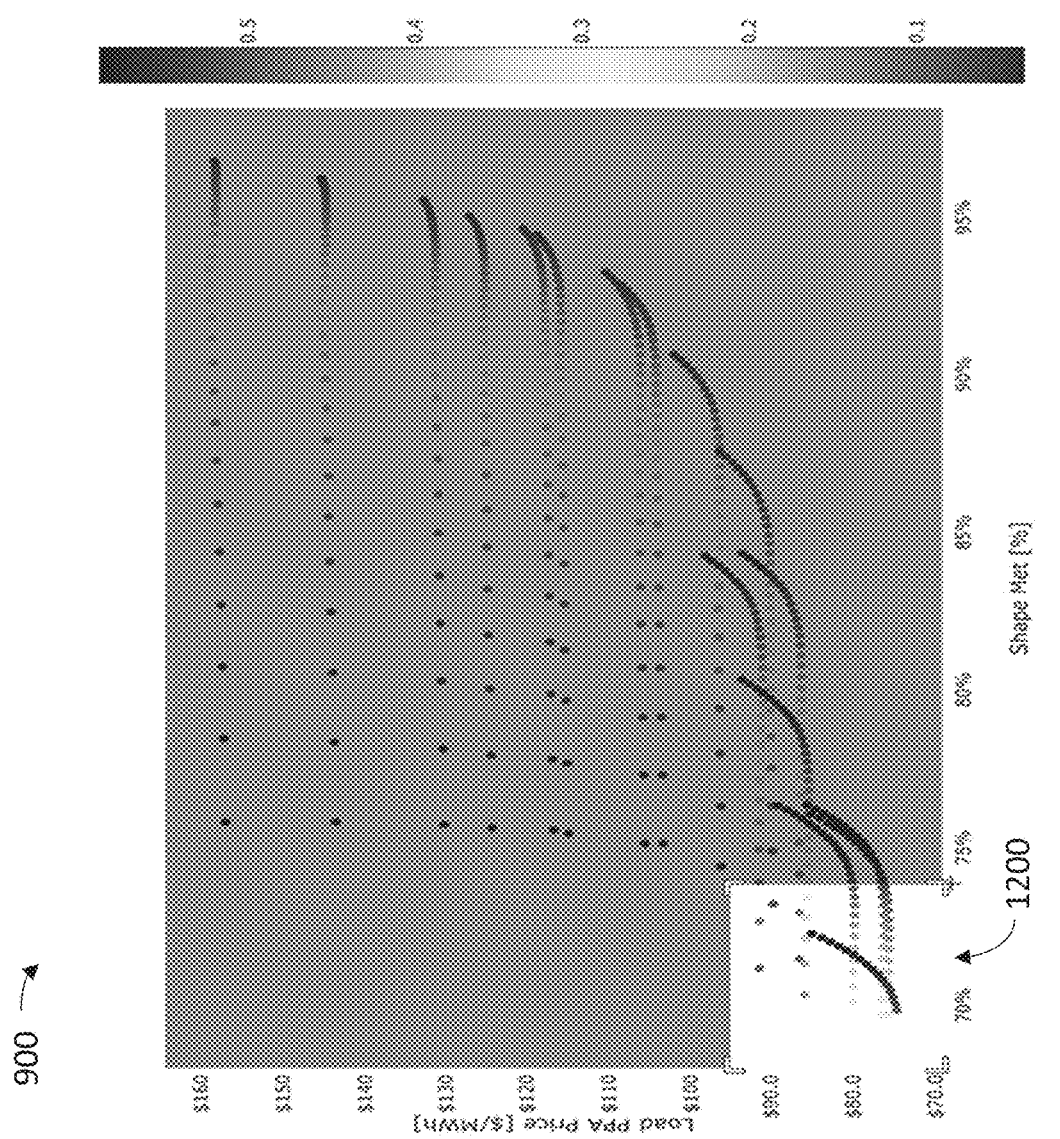
FIG. 12 illustrates selection of a portion of the chart of FIG. 11.

FIG. 12 illustrates selection of a portion 1200 of the chart 900 of FIG. 11. Selection of the portion 1200 of the chart 900 is similar to filtering the chart 900, but allowing for filtering according to multiple parameters (shape met and load PPA price) by selecting the portion 1200 of the chart. The portion 1200 of the chart 900 may be selected based on the portion 1200 being in the lower left portion of the chart 900 corresponding to lowest load PPA price values.

Figure 13:
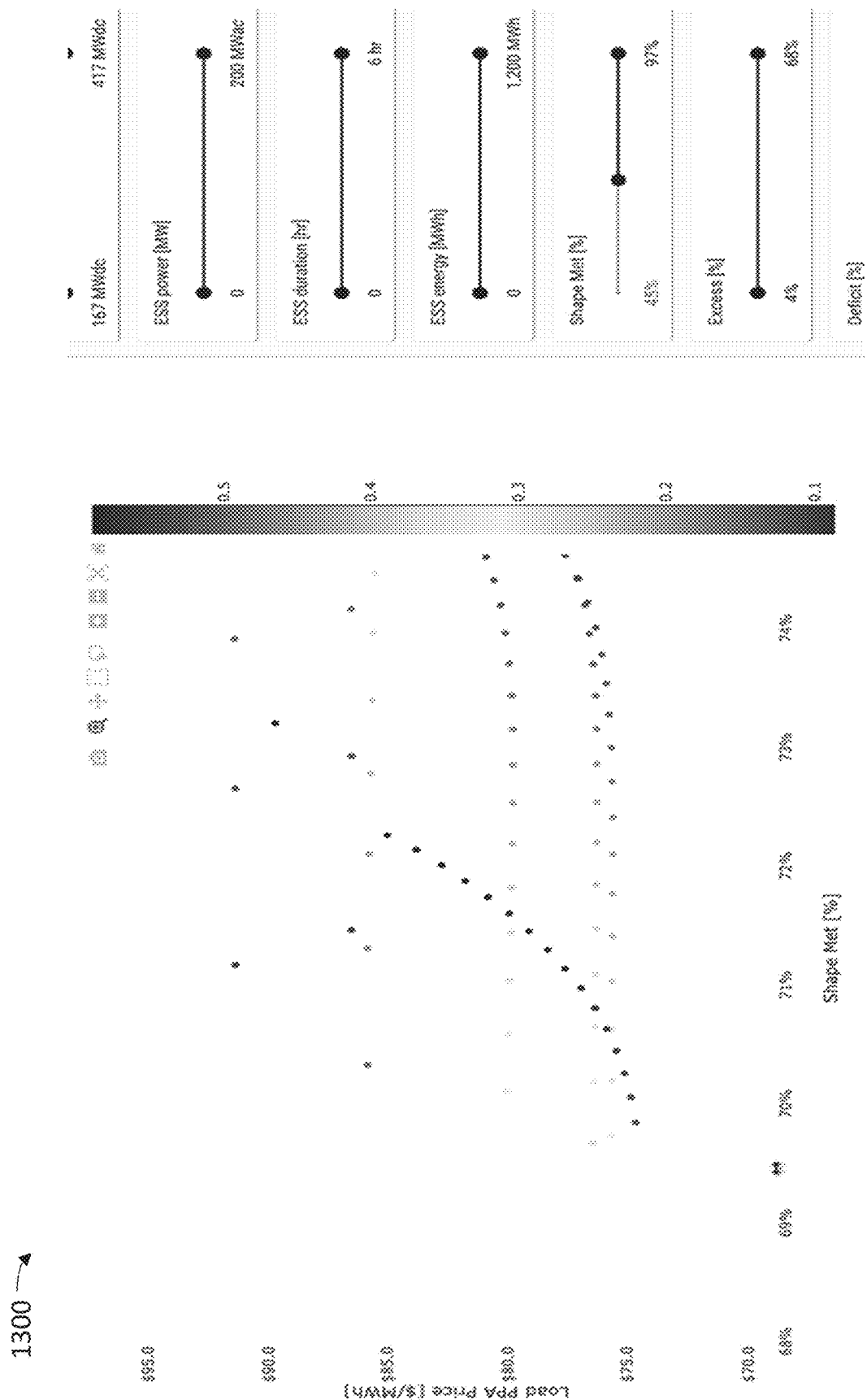
FIG. 13 illustrates an example chart corresponding to the selected portion of the chart of FIG. 12.

FIG. 13 illustrates an example chart 1300 corresponding to the selected portion 1200 of the chart of FIG. 12.

Figure 14:
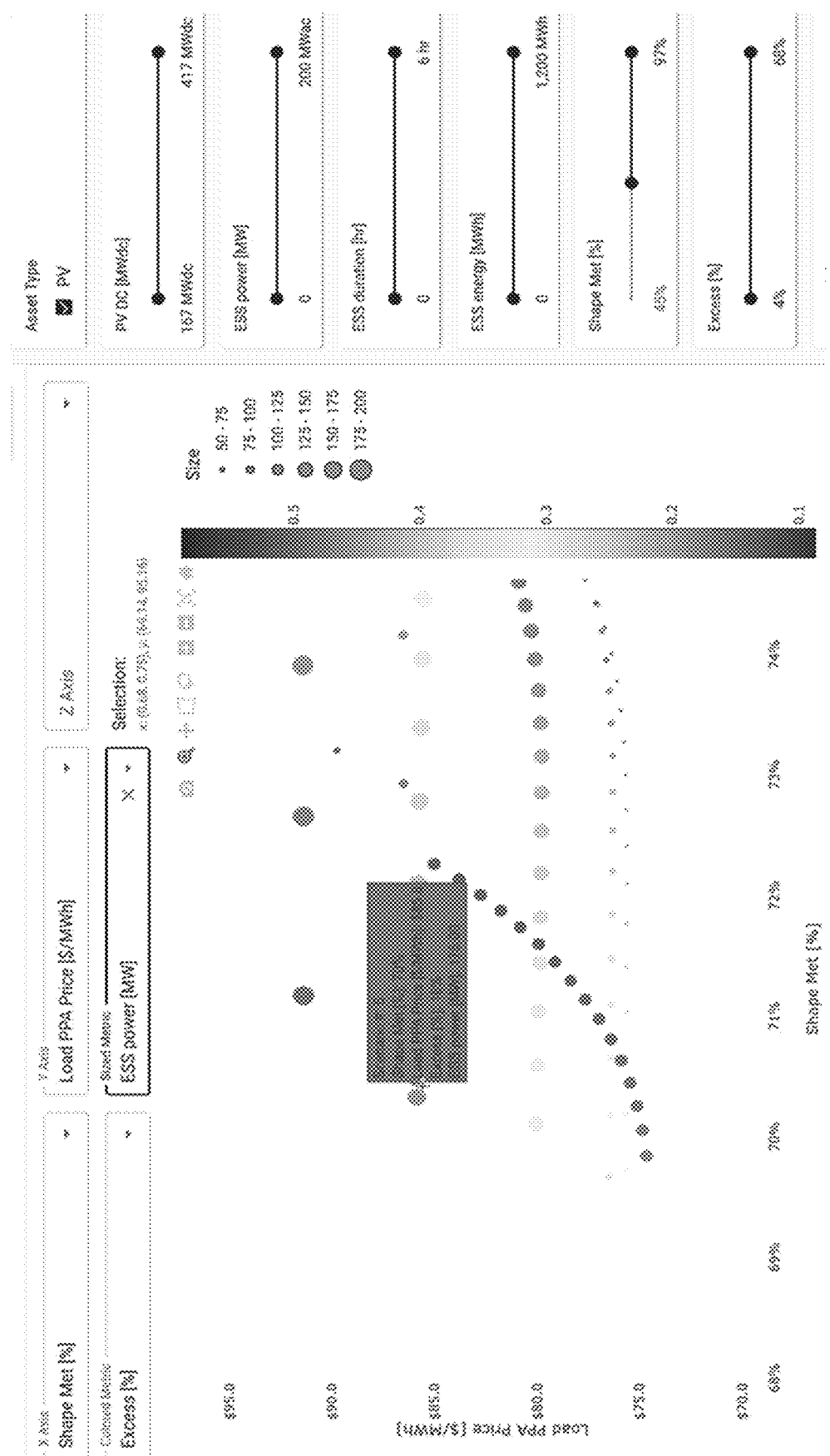
FIG. 14 illustrates the chart of FIG. 13, with sizes of points on the chart corresponding to a size, or capacity of an energy storage system (ESS).

FIG. 14 illustrates the chart 1300 of FIG. 13, with sizes of points on the chart corresponding to a size, or capacity of an energy storage system (ESS). The chart 1300 illustrates how including additional information in the chart, such as excess power generated, can indicate a more optimal solution. In an example, points on the bottom left of the chart may represent an optimal plant configuration in terms of shape met and load PPA price, but not when factoring in the excess power generated. When factoring in the excess power generated, which exposes the plant to the risk of volatile market power prices, the point selected in FIG. 14 (corresponding to a configuration having an ESS capacity of 175 MW) is a more optimal solution than the points in the bottom left of the chart 1300, as the selected point in FIG. 14 has an excess power percentage of 16%, while the points in the bottom left of the chart 1300 have excess power percentages of around 50%. The points in the chart 1300 of FIG. 14 can be used to compare potential parameters of a renewable energy power plant for implementation. In this way, the chart 1300 can facilitate the second optimization, where a version of the renewable energy power plant is selected to optimize for the load PPA price, the shape met percentage, the excess power generation, and/or the ESS capacity.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a model stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the monitoring device 102) to perform actions by operating on input data and generating an output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for simulating a renewable energy power plant (REPP), comprising:
   receiving first parameters of a first renewable energy asset of a first type to be simulated, wherein the first parameters include a first set of parameters within a first predetermined range;
   receiving second parameters of a second renewable energy asset of a second type to be simulated, wherein the second parameters include a second set of parameters within a second predetermined range;
   correlating the first and second sets of parameters into a plurality of simulated REPPs;
   for each simulated REPP of the plurality of simulated REPPs, calculating output parameters by co-optimizing dispatch of the first renewable energy asset and the second renewable energy asset, wherein co-optimizing dispatch of the first renewable energy asset and the second renewable energy asset includes controlling the first renewable energy asset and the second renewable energy asset based on a predetermined operation type indicating optimization parameters for the dispatch;
   displaying a graph including a visual representation of one or more output parameters of the output parameters of each simulated REPP of the plurality of simulated REPPs;
   receiving user input selecting a simulated REPP of the plurality of simulated REPPs; and displaying one or more additional output parameters of the selected simulated REPP.

2. The method of claim 1, wherein receiving the first parameters includes receiving the first predetermined range and increments within the first predetermined range.

3. The method of claim 1, wherein each visual representation includes a position on the graph indicating two output parameters and a color indicating a third output parameter.

4. The method of claim 1, further comprising receiving user input indicating the one or more optimization parameters for co-optimizing the dispatch of the first renewable energy asset and the second renewable energy asset.

5. The method of claim 1, wherein co-optimizing the dispatch of the first renewable energy asset and the second renewable energy asset according to the predetermined operation type includes controlling the first renewable energy asset and the second renewable energy asset based on a predetermined power delivery profile, controlling the first renewable energy asset and the second renewable energy asset to maximize a revenue generated by exporting and importing power from a utility grid, or a weighted combination of matching the predetermined power delivery profile and maximizing the revenue generated by exporting and importing power from the utility grid.

6. The method of claim 1, wherein co-optimizing the dispatch of the first renewable energy asset and the second renewable energy asset includes executing a first model for the first renewable energy asset and a second model for the second renewable energy asset, wherein the first model and the second model are linked during execution to co-optimize the dispatch of the first renewable energy asset and the second renewable energy asset.

7. The method of claim 1, wherein the first type of renewable energy asset comprises photovoltaic (PV) arrays, and wherein the second type of renewable energy asset comprises energy storage systems (ESSs).

8. The method of claim 1, wherein calculating the output parameters for each simulated REPP includes co-optimizing the dispatch of the first renewable energy asset, the second renewable energy asset, and a third renewable asset.

9. The method of claim 8, wherein the third renewable asset is of a type of renewable asset selected from the first type of renewable energy asset, the second type of renewable energy asset, and a third type of renewable energy asset.

10. A non-transitory, computer-readable medium including instructions for simulating a renewable energy power plant (REPP) which, when executed by one or more processors, cause the one or more processors to:
receive first parameters of a first renewable energy asset of a first type to be simulated, wherein the first parameters include a first set of parameters within a first predetermined range;
receive second parameters of a second renewable energy asset of a second type to be simulated, wherein the second parameters include a second set of parameters within a second predetermined range;
correlate the first and second sets of parameters into a plurality of simulated REPPs;
for each simulated REPP of the plurality of simulated REPPs, calculate output parameters by co-optimizing the dispatch of the first renewable energy asset and the second renewable energy asset, wherein co-optimizing dispatch of the first renewable energy asset and the second renewable energy asset includes controlling the first renewable energy asset and the second renewable energy asset based on a predetermined operation type indicating optimization parameters for the dispatch;
display a graph including a visual representation of one or more output parameters of the output parameters of each simulated REPP of the plurality of simulated REPPs;
receive user input selecting a simulated REPP of the plurality of simulated REPPs; and
display one or more additional output parameters of the selected simulated REPP.

11. The non-transitory, computer-readable medium of claim 10, the instructions cause the one or more processors to receive the first parameters by receiving the first predetermined range and increments within the first predetermined range.

12. The non-transitory, computer-readable medium of claim 10, wherein each visual representation includes a position on the graph indicating two output parameters and a color indicating a third output parameter.

13. The non-transitory, computer-readable medium of claim 10, wherein the instructions cause the one or more processors to receive user input indicating the one or more optimization parameters for co-optimizing the dispatch of the first renewable energy asset and the second renewable energy asset.

14. The non-transitory, computer-readable medium of claim 10, wherein the instructions cause the one or more processors to co-optimize the dispatch of the first renewable energy asset and the second renewable energy asset according to the predetermined operation type by controlling the first renewable energy asset and the second renewable energy asset based on a predetermined power delivery profile, controlling the first renewable energy asset and the second renewable energy asset to maximize a revenue generated by exporting and importing power from a utility grid, or a weighted combination of matching the predetermined power delivery profile and maximizing the revenue generated by exporting and importing power from the utility grid.

15. The non-transitory, computer-readable medium of claim 10, wherein the instructions cause the one or more processors to co-optimize the dispatch of the first renewable energy asset and the second renewable energy asset by executing a first model for the first renewable energy asset and a second model for the second renewable energy asset, wherein the first model and the second model are linked during execution to co-optimize the dispatch of the first renewable energy asset and the second renewable energy asset.

16. The non-transitory, computer-readable medium of claim 10, wherein the first type of renewable energy asset comprises photovoltaic (PV) arrays, and wherein the second type of renewable energy asset comprises energy storage systems (ESSs).

17. The non-transitory, computer-readable medium of claim 10, wherein the instructions cause the one or more processors to calculate the output parameters for each simulated REPP includes co-optimizing the dispatch of the first renewable energy asset, the second renewable energy asset, and a third renewable asset.

18. The non-transitory, computer-readable medium of claim 17, wherein the third renewable asset is of a type of renewable asset selected from the first type of renewable energy asset, the second type of renewable energy asset, and a third type of renewable energy asset.

* * * * *